(12) United States Patent
Grewal et al.

(10) Patent No.: US 9,094,733 B2
(45) Date of Patent: Jul. 28, 2015

(54) METHODS AND SYSTEMS FOR CRYPTOGRAPHIC ACCESS CONTROL OF VIDEO

(75) Inventors: Karanvir S. Grewal, Hillsboro, OR (US); David Durham, Beaverton, OR (US); Xiaozhu Kang, Fremont, CA (US); Men Long, Beaverton, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 13/977,529

(22) PCT Filed: Mar. 31, 2012

(86) PCT No.: PCT/US2012/031753
§ 371 (c)(1),
(2), (4) Date: Jun. 28, 2013

(87) PCT Pub. No.: WO2013/147908
PCT Pub. Date: Oct. 3, 2013

(65) Prior Publication Data
US 2014/0044258 A1     Feb. 13, 2014

(51) Int. Cl.
*G06F 21/62*     (2013.01)
*H04N 21/647*     (2011.01)
(Continued)

(52) U.S. Cl.
CPC ....... *H04N 21/64715* (2013.01); *H04N 21/266* (2013.01); *H04N 21/4405* (2013.01); *H04N 21/4627* (2013.01); *H04N 21/8355* (2013.01)

(58) Field of Classification Search
CPC .. H04N 21/6336; H04L 9/088; G06F 13/368; G06F 21/62
See application file for complete search history.

(56) References Cited

U.S. PATENT DOCUMENTS 8,736,701 B2 * 5/2014 Marman et al. ............ 348/222.1
2003/0196114 A1 * 10/2003 Brew et al. ................... 713/201
(Continued)

FOREIGN PATENT DOCUMENTS

JP     2005308966 A     4/2004
KR     10-0320626 B1    1/2002
(Continued)

OTHER PUBLICATIONS

International Search Report and Written Opinion received for International Application No. PCT/US2012/031753, mailed Nov. 26, 2012, 9 pages.
(Continued)

*Primary Examiner* — Venkat Perungavoor
(74) *Attorney, Agent, or Firm* — Garrett IP, LLC

(57) ABSTRACT

Cryptographic access control of multimedia video is presented. A method includes generating as metadata an access control policy (ACP) associated with video, the ACP including authorization rules and cryptographic information associated with an encryption policy; encrypting the video according to the encryption policy; and encoding the encrypted video with the authorization rules and the cryptographic information, which may be used to decrypt and render the encoded video. As an example, an authorized receiver device having credentials and/or capabilities matched to the authorization rules may extract the ACP information from the encrypted video and use it to decrypt and properly render the video. The method may further include visually encoding the encrypted video with at least portions of the authorization rules and the cryptographic information, such that the visually encoded video is renderable as the video by an authorized device, but is renderable as visually unintelligible video by an unauthorized device.

23 Claims, 11 Drawing Sheets

(51) Int. Cl.
*H04N 21/266* (2011.01)
*H04N 21/4405* (2011.01)
*H04N 21/4627* (2011.01)
*H04N 21/8355* (2011.01)
*H04L 9/18* (2006.01)

(56) References Cited

U.S. PATENT DOCUMENTS

| | | |
|---|---|---|
| 2003/0235325 A1 | 12/2003 | Ray et al. |
| 2004/0081334 A1 | 4/2004 | Hayashi |
| 2004/0158731 A1* | 8/2004 | Narin et al. ............. 713/200 |
| 2005/0038996 A1* | 2/2005 | Meyerson ................ 713/165 |
| 2005/0276284 A1 | 12/2005 | Krause et al. |
| 2006/0045309 A1 | 3/2006 | Suthaharan |
| 2006/0123238 A1 | 6/2006 | Kacker et al. |
| 2008/0101604 A1 | 5/2008 | Kocher et al. |
| 2008/0189796 A1* | 8/2008 | Linn et al. ................ 726/30 |
| 2010/0027853 A1 | 2/2010 | Wen |
| 2010/0094639 A1* | 4/2010 | Rhoads ..................... 704/500 |
| 2011/0197056 A1 | 8/2011 | Chen |
| 2011/0213971 A1* | 9/2011 | Gurel et al. ............... 713/165 |
| 2011/0222687 A1 | 9/2011 | Mori |
| 2012/0137130 A1* | 5/2012 | Vainstein et al. .......... 713/165 |

FOREIGN PATENT DOCUMENTS

| | | |
|---|---|---|
| KR | 10-2008-0003299 A | 1/2008 |
| WO | 2005050992 A1 | 6/2005 |
| WO | 2013089758 A1 | 6/2013 |
| WO | 2013100898 A1 | 7/2013 |
| WO | 2013147908 A1 | 10/2013 |

OTHER PUBLICATIONS

International Search Report and Written Opinion received for International Application No. PCT/US2011/067367, mailed Sep. 14, 2012, 8 pages.

International Search Report received for International Application No. PCT/US2011/065284, mailed Aug. 27, 2012, 2 pages.

International Preliminary Report on Patentability and Written Opinion Received for PCT Patent Application No. PCT/US2011/085284, mailed on Jun. 26, 2014, 6 pages.

International Preliminary Report on Patentability and Written Opinion Received for PCT Patent Application No. PCT/US2011/087367, mailed on Jul. 10, 2014, 5 pages.

International Preliminary Report on Patentability and Written Opinion Received for PCT Patent Application No. PCT/US2012/031753, mailed on Oct. 9, 2014, 5 pages.

\* cited by examiner

METHODS AND SYSTEMS FOR CRYPTOGRAPHIC ACCESS CONTROL OF VIDEO

BACKGROUND

Multimedia content creation and consumption is on the rise across a wide variety of devices including cell phones, laptop and desktop computers, and back end cloud services. Such content is created by different parties including individual consumers, corporations, governments, and professional studios. A common need associated with such generated content is to share the content only with authorized parties, and to provide a statement of ownership or indication of source in the content. With the adoption of cloud based web services, content sharing has been achieved traditionally by providing access control services to individuals through accounts provided through web services, for example. However, once the content is uploaded to a given cloud service, ownership and access to underlying content is often surrendered to the service provider and any party able to download and then manipulate the downloaded content.

BRIEF DESCRIPTION OF THE DRAWINGS/FIGURES

Figure 1:
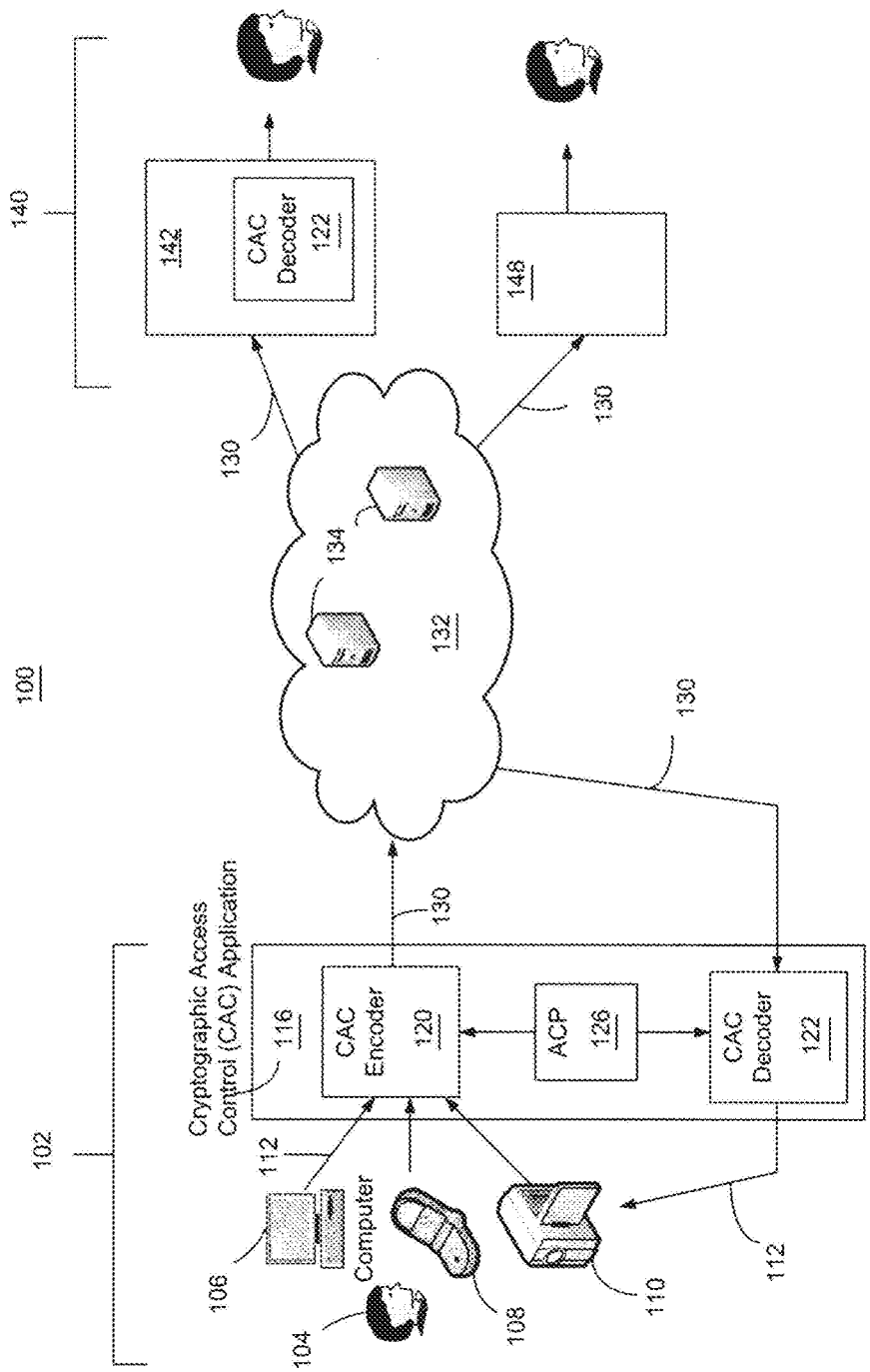
FIG. 1 is an example system in which multiple user environments are equipped to provide cryptographic access control (CAC) of associated video.

In the drawings, the leftmost digit(s) of a reference number identifies the drawing in which the reference number first appears.

DETAILED DESCRIPTION

Techniques for cryptographic access control (CAC) of video are described, according to various embodiments. The techniques may include embedding access control policies (ACPs) directly into multimedia content, including video, giving a creator of the content additional control on who has access to it and how it may be used, while preserving the ability to store and share the content using, e.g., cloud based services. The techniques may include embedding authorization rules and cryptographic information into encrypted content, such that only authorized recipients may be able to extract the authorization rules and cryptographic information needed to decrypt and properly render the video content. In contrast, unauthorized recipients may only be able to render the content as noise. Cryptographically secured content may be stored in different known formats in cloud based services, and replicated, changed, and shared without revealing the original or underlying (unencrypted) content. In this way, the content creator may be able to control access to the underlying content. The authorization policies/rules may be bound to one or more device credentials, including specific device rendering capabilities, to allow rendering only on such devices, thereby differentiating between authorized and unauthorized devices. This may ensure that the encrypted content is protected from interception by unauthorized malicious software applications intent on capturing and pirating the underlying content. Also, described herein are techniques to embed unique video patterns into video content, which may be tied to the authorization rules. The unique video patterns may serve as watermarks that identify source, even when that watermarked video content is copied using manual methods, such as by directing a video camera at a rendered display of the watermarked video content.

FIG. 1 is a system 100 in which multiple user environments 102 and 140 are equipped to provide cryptographic access control (CAC) of associated video, according to an embodiment. While the ensuing description refers mainly to video, the systems and processes described herein are equally applicable to other types of content, e.g., multimedia video and related audio and data, video objects, audio, images, and text. User environment 102 may include a user 104, and may include one or more user devices/machines operated by the user, such as a computer 106, a smart phone 108, or a camera 110, or a television monitor (not shown in FIG. 1), each equipped to display video, and/or capture a video of a scene, convert the captured video to input video 112, which may be unformatted or formatted, and provide the input video to a CAC application 116. CAC application 116 includes modules that perform CAC processes described herein, and may include a CAC encoder 120, a CAC decoder 122, and an access control protocol (ACP) 126 stored in a memory allocated to CAC application 116. This memory may include information representative of an ACP, including access control authorization rules and cryptographic information associated with an encryption policy. ACP 126 may be accessible to both CAC encoder 120 and CAC decoder 122. In alternative embodiments, only encoder 120 or decoder 122 may be present in a given CAC application. Although in FIG. 1 CAC application 116 is depicted external to devices 106, 108, and 110, alternatively, the CAC application may reside in and operate on any of the devices, or any other video processing machine/device(s) that is/are in communication with the devices. As will be described more fully below, the device on which CAC application 116 resides may possess one or more user and/or device credentials that are made accessible to CAC decoder 122, such as, but not limited to, a unique device identifier, a unique user identifier entered into the device by a user, or a specific video rendering capability. Alternatively, the user 104, or a group of users, may supply credentials to the device. Either way, the credentials are associated with user environment 102.

CAC encoder 120 may format the video 112 if it is initially unformatted. CAC encoder 120 encrypts the formatted video according to the encryption policy, and then encodes appropriate portions of the ACT information into the encrypted video as ACP metadata so that the ACP metadata is embedded in the encrypted video, to produce encoded video 130. As used herein, "encoded video" refers generally to the encoded video produced in user environment 102 regardless of the format, e.g., MPEG-n, regardless of form, e.g., streamed video, video stored in a file, or on a web server, etc., or regardless of the specific encoding scheme used to encode the video, e.g., visual encoding or otherwise, as discussed below.

CAC application 116 may transmit encoded video 130 to a network 132 such as the internet, for public or private distribution by any known method, record the encoded video to a DVD or other medium, upload the video as one or more video files to cloud services 134 for subsequent download, or stream the encoded video through the network to another user environment. Regardless of the manner in which the encoded video is stored, transmitted, or distributed, the ACP metadata carrying the ACP policy remains embedded in the encoded video 130 and, therefore, travels with the encoded video to any recipient of the encoded video, such as a receiving device. In an alternative embodiment, all, or portions of, the ACP metadata is not actually encoded into the encrypted video but is transmitted separately from the encrypted video in an out-of-band channel, as is discussed more fully below.

Through CAC 116, user environments 102 and 140 may retrieve encoded video 130 or other encoded video from other user environments or sources, e.g., from cloud services 134, or streamed from another user. CAC decoder 122 receives the encoded video 130, and recovers/extracts necessary ACP information embedded in the encoded video, including authorization rules and cryptographic information. CAC decoder 122 compares the recovered authorization rules to the user/device credentials and, if they match, then CAC decoder 122 further processes the encoded video. That is, CAC decoder 122 decrypts and renders the video, in accordance with the cryptographic information and authorization rules, which is then displayed at any of devices 106, 108, and 110. If the user/device credentials match, then user environment 102 and its associated device(s) that carry those matching credentials are considered "authorized." In contrast, if the credentials do not match, then user environment 102 and its associated devices are considered "unauthorized."

System 100 also includes an authorized user environment 140 connected to network 132. Device 142 is authorized because it carries credentials or capabilities that match those required by the authorization rules. Accordingly, CAC decoder 122 of device 142 is able to process encoded video 130 in accordance with the authorization rules, so as to recover the video initially captured by devices 106, 108, or 110. In contrast, an unauthorized device 148 does not carry the necessary credentials or capabilities required by the authorization rules and is, therefore, incapable of processing, i.e., decrypting and rendering video 130.

Figure 2:
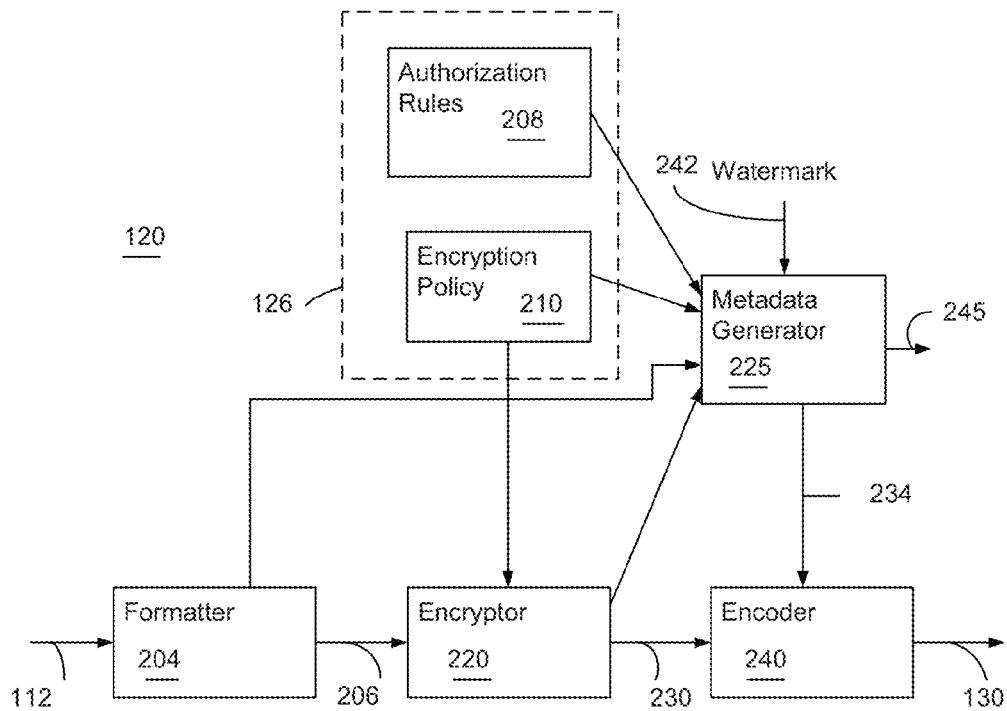
FIG. 2 is a block diagram of an example CAC encoder and an example Access Control Protocol (ACP) generator from FIG. 1.

FIG. 2 is a block diagram of CAC encoder 120 and ACP 126, according to an embodiment. Video 112 is input to encoder 120. Video 112 may be formatted in accordance with any one of a number of format/compression formats known to persons of ordinary skill in the art, including but not limited to, any of the MPEG-n formats, Windows Media Video (WMV), flash video, and so on. Alternatively, if input video 112 is not formatted, a formatter 204 may format the input video according to one of the aforementioned formats, to produce formatted/compressed video 206, which may include a series or stream of video objects of predetermined format, as discussed below in connection with FIG. 5.

Formatter 204 provides format related control and information to other modules of CAC encoder 120 sufficient to enable the other modules to process and maintain the given format. As such, the functions performed by formatter 204 may be distributed throughout the other modules of CAC encoder 120. Formatter 204 also determines the extent to which the video format is able to accommodate the inclusion of metadata beyond that which is part of the format definition. If the format is unable to accommodate the inclusion of additional metadata, or can only accommodate a small portion of additional metadata insufficient for the needs of encoder 120, then formatter 204 communicates this to a metadata generator 225.

A encryptor 220 and metadata generator 225 access ACP 126, for authorization rules 208 and encryption policy 210. Encryptor 220 encrypts formatted video 206 in accordance with encryption policy 210 using one or more cryptographic keys, to produce encrypted video 230. In an embodiment, encryption policy 210 may include asymmetric encryption, such as public key encryption. Encryptor 220 and/or ACP 126 provides to metadata generator 225 cryptographic information, such as an identifier, e.g., a random number, that associates with an encryption key necessary to decrypt encrypted video 230.

Metadata generator 225 formats the authorization rules 208 and the cryptographic information as ACP metadata 234 consistent with the format, e.g., video object (VOB) format, of encrypted video 230, and provides the ACP metadata 234 to an encoder 240. Encoder 240 encodes ACP metadata 234, including the authorization rules and cryptographic information, into encrypted video 230, to produce encoded video 130. Encoder 240 embeds ACP metadata 234 into encrypted video 230 and, therefore, the embedded ACP metadata is carried in, and with, the encoded video 130. In addition, watermark information 242, indicative of one or more watermarks to be encoded into encrypted video 230, may be provided to metadata generator 225. Metadata generator 225 formats the one or more watermarks as watermark metadata and provides the watermark metadata to encoder 240. Encoder 240 may encode the watermark metadata into encrypted video 230. Alternatively, watermark information 242 may be provided directly to encoder 240 to then be encoded by the encoder. In an embodiment, the watermark may be visually encoded, as will be described below.

If formatter 204 indicates to metadata generator 225 that the video format is unable to accommodate some or all of the required ACP metadata, then the metadata generator may format that portion of the ACP metadata that cannot be encoded as out-of-band ACP metadata 245 suitable for transmission in an out-of-band channel separate from the transmission of the partially encoded or only encrypted) video. Out-of-band ACP metadata 245 may be provided, from user environment 102 to another user environment, via user requests processed through a web service that uses web service formats such as Extensible Markup Language (XML), Extensible Markup Access Control Markup language (XACLML), or other World Wide Web Consortium (W3C)

formats, in order to provide an independent coupling between the encrypted video and the out-of-band APC metadata.

Figure 3:
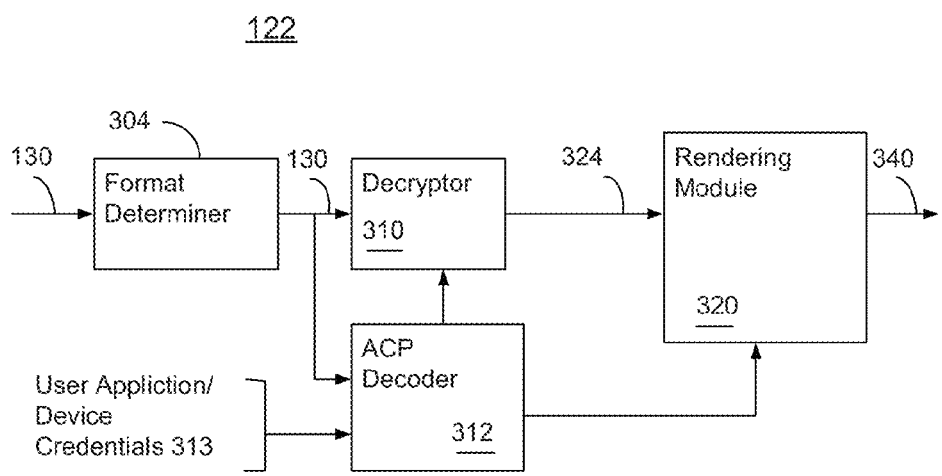
FIG. 3 is a block diagram of an example authorized CAC decoder from FIG. 1.

FIG. 3 is a block diagram of CAC decoder 122, according to an embodiment. A format determiner 304 receives encrypted video 130 and determines its format, e.g., MPEG-n, Flash Video (FLV), etc. Format determiner 304 provides format control and information to other modules of decoder 122 sufficient to enable the other modules to operate on video in accordance with the determined format. An ACP decoder 312, cooperating with format determiner 304, attempts to decode encoded video 130 so as to extract its embedded ACP metadata. If ACP decoder 312 successfully extracts all or some of the ACP metadata, then the ACP decoder compares the extracted authorization rules to device credentials 313 provided to the ACP decoder to determine whether the device is authorized. Credentials 313 may be stored in CAC decoder 122, or elsewhere in the device on which the CAC decoder resides. If the credentials match the extracted authorization rules, then the device is authorized and further processing of encrypted video 130 may continue. ACP decoder 312 may extract further ACP metadata based on the already extracted authorization rules. ACP decoder 312 provides the extracted cryptographic information and authorization rules to a decryptor 310 and a video rendering unit 320, respectively.

Decryptor 310 decrypts encoded and encrypted) video 130 in accordance with the encryption policy/cryptographic information extracted by ACP recovery unit 312, to produce decrypted video 324. Video rendering module/engine 320 renders decrypted video 324 in accordance with the recovered authorization rules to produce display video 340 representing the video initially captured in user environment 102.

Figure 3A:
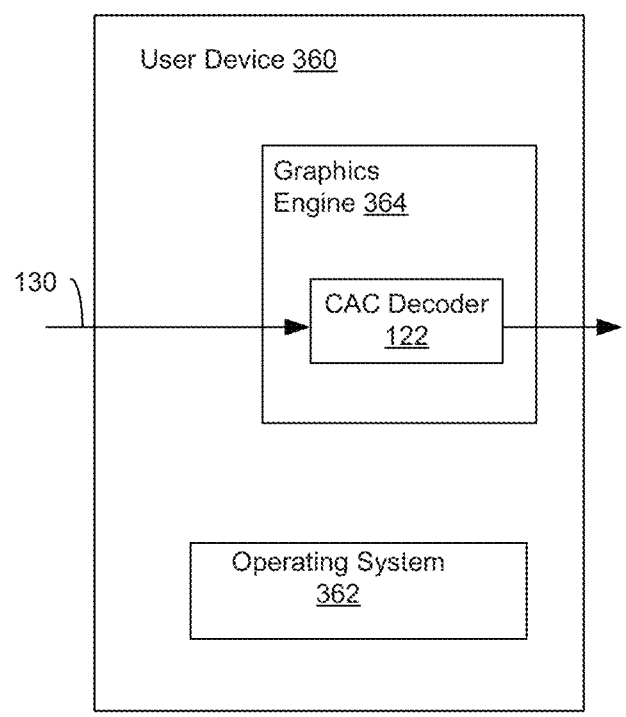
FIG. 3A is a block diagram of an example user device that includes an operating system and a graphics rendering engine that fully incorporates the functions of the CAC decoder from FIG. 3.

FIG. 3A is a block diagram of an example user device 360 that includes an operating system 362 and a graphics engine 364, according to an embodiment. Graphics engine 364 incorporates all of the modules of CAC decoder 122 depicted in FIG. 3, including format determiner 304, decryptor 310, ACP decoder 312, and rendering module 320. In an embodiment, graphics engine 364 performs all the decoder and rendering methods and process described herein autonomously, independent of interactions with operating system 362. In another embodiment, graphics engine 364 may also incorporate all of CAC encoder 120, which may also operate independent of the operating system. Also, in each of the above mentioned graphics engine embodiments, all or some of ACP 126 may reside in a memory of graphics engine 364 in support of the CAC decoder and/or encoder also incorporated in the graphics engine, thus permitting independent operation of the CAC decoder/encoder relative to operating system 362. In other words, all of CAC application 116, or only parts of CAC application 116, may reside within graphics engine 364.

Figure 4:
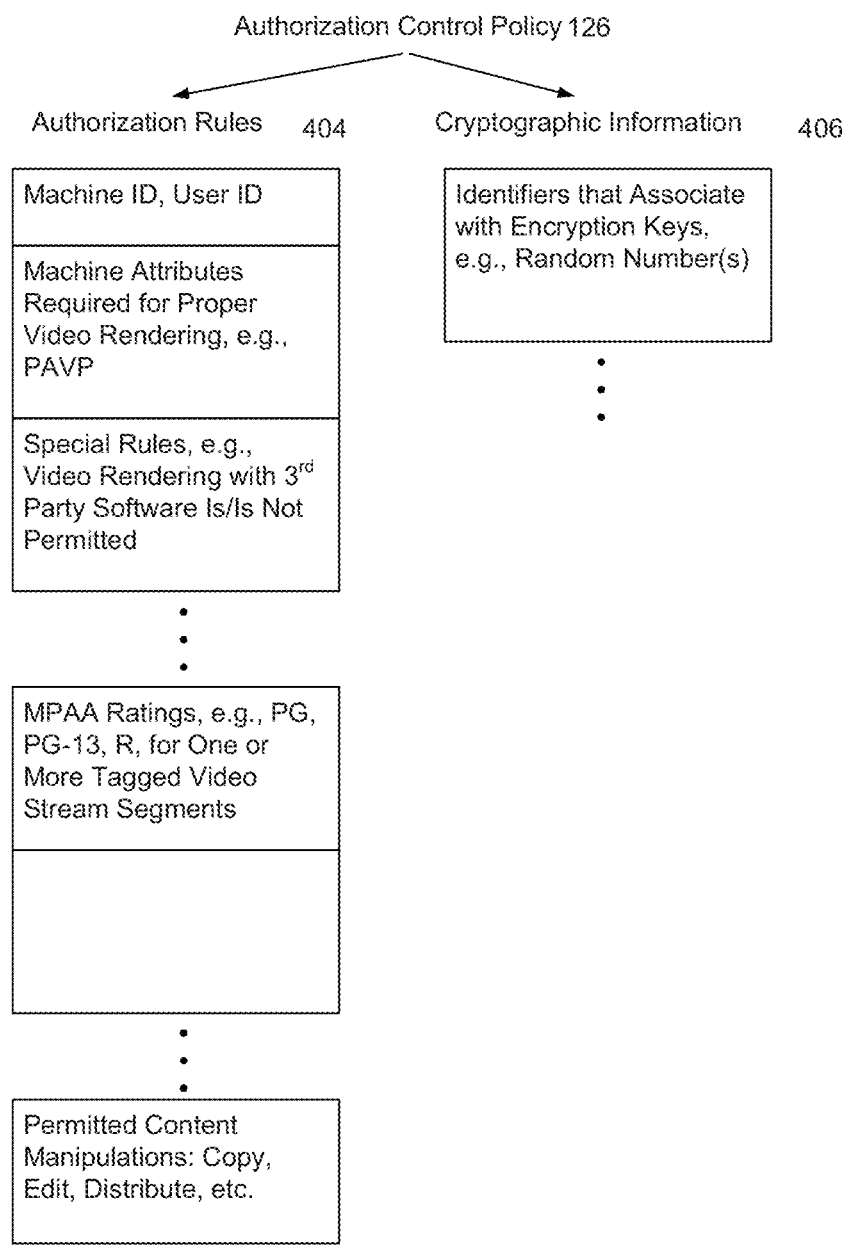
FIG. 4 is an example of access control protocols accessible to and generated by the ACP generator of FIG. 1.

FIG. 4 is an example of ACP and related information 126. ACP 126 may include a set or list of exemplary authorization rules 404 and a set of cryptographic information 406 corresponding to an encryption policy associated with ACP 126. Rules 404 and cryptographic information 406 are embedded or encoded into video 130 as metadata, as described above.

Authorization rules 404 may be loosely categorized as (i) credentials, e.g., criteria, attributes, or capabilities, e.g., video rendering capabilities, that an authorized environment, such as a device in a user environment, must meet or have in order to be able to process, i.e., decode, decrypt, and/or properly render, a received encoded video, and (ii) content access controls/permissions that control video rendering and/or what the authorized application can do with the content of the rendered video. A user may enter all, or portions, of the authorization rules into a device through any conventional user interface associated with the device, which stores such entered credentials in a local memory.

Authorization rules 404, include, but are not limited to, identifiers, e.g., a machine identifier (ID), and a user ID.

Rules 404 may list specific machine/device attributes that the rendering machine of a user environment must have to be able to render decrypted video, e.g., Protected Audio Video Path (PAVP) capability provided by video rendering chip sets manufactured by Intel Corp. Rules 404 may include instructions for rendering machines to ensure video is only rendered properly for an authorized user, by combining other techniques for detecting user presence/authentication stemming directly from a graphics pipeline in the rendering machines, which eliminates spoofing capabilities of malicious software. As discussed above in connection with FIG. 3A, such device capabilities may be provided by a single module (e.g., a graphics rendering engine or subcomponent) and decision making/processing is handled by that module, agnostic and independent to any interactions with an underlying operating system of the device.

Rules 404 may enforce special conditions, e.g., that video rendering with third party software, i.e., software not native to the host rendering engine, is not permitted.

Rules 404 may include user or intended audience specific access controls, including, e.g., Motion Picture (MP) ratings, such as PG, PG-13, or R. Each MP rating may be embedded in a predetermined segment of encoded video 130, such that the encoded video has multiple segments each including a different rating suitable for a different audience.

Rules 404 may include permitted content manipulation controls, including, e.g., permissions to copy, edit, and/or distribute content.

Cryptographic information 406 may include, e.g., identifiers that associate with one or more encryption keys, e.g., random numbers from which a key may be derived by an authorized receiving device. Information 406 may include an identity of a specific encryption policy, such as public key encryption, and/or rules for encryption/decryption in accordance with the policy.

Figure 5:
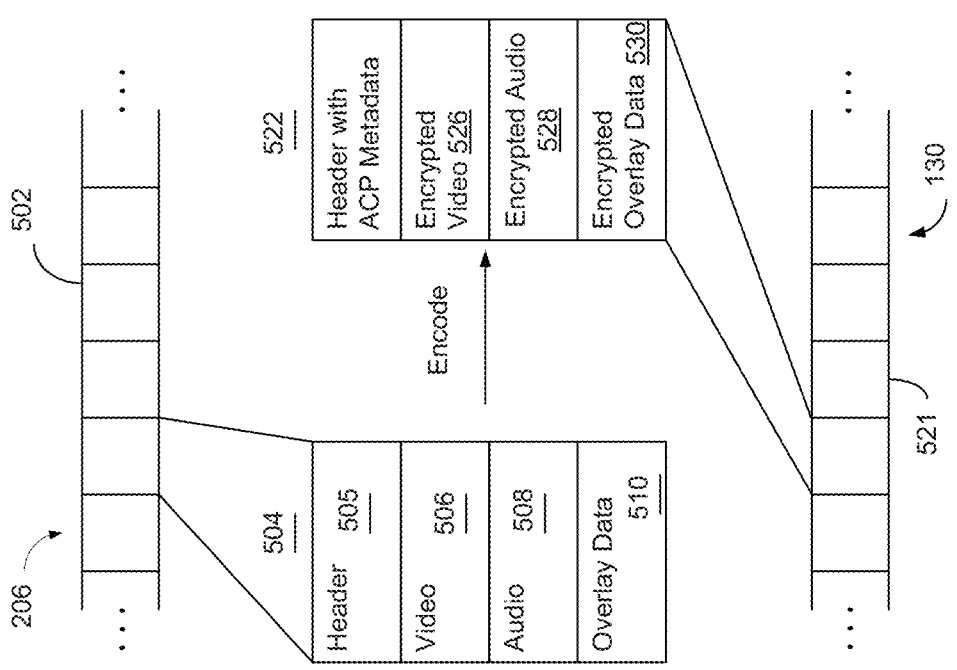
FIG. 5 is a diagram of example video at different stages of encoding in the encoder of FIG. 2, and an example of encoding ACP metadata into video object headers.

FIG. 5 is a diagram of example video at different stages of encoding in encoder 120, and an example of encoding ACP metadata into video object headers, according to an embodiment. At the top of FIG. 5, formatted video 206 (from FIG. 2) comprises a time series of video frames 502 having an exemplary frame rate of 30 frames per second. Each frame 502 carries one or more formatted video objects 504. VOB 504 typically includes a header 505, and interlaced video 506, audio 508, and overlay data 510, which may include video rendering instructions, arranged according to a predetermined format of the VOB.

At the bottom of FIG. 5, encoded video 130 includes a time series of encoded video frames 521 corresponding to the series of frames 502. Each frame 521 carries one or more encoded video objects 522. In the depicted embodiment, encoded VOB 522 includes ACP metadata 234 inserted or embedded into header 505. Encoded VOB 522 also includes encrypted video 526, encrypted audio 528, and encrypted data 530, corresponding to video 506, audio 508, and data 510.

Figure 6:
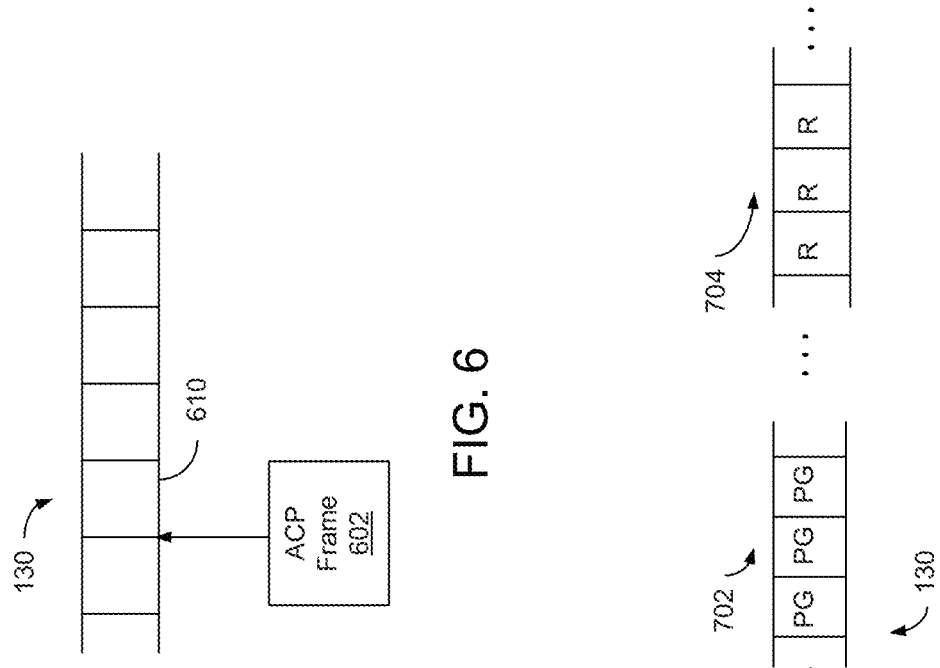
FIG. 6 is another example of encoding ACP metadata into an encoded video, by inserting ACP metadata frames.

FIG. 6 is another example of encoding ACP metadata into encoded video 130, by inserting ACP metadata frames. In FIG. 6, ACP metadata 234 is formatted as an entire data frame 602, which is periodically inserted into encoded video 130. In other words, encoder 240 inserts ACP metadata frame 602 into encrypted video 230, to produce encoded video 130. In an embodiment, ACP metadata frame 602 is inserted between consecutive encrypted video frames 610. In another embodiment, frame 602 replaces one of video frames 610, or one or more video objects within one of the frames 610.

Figure 7:
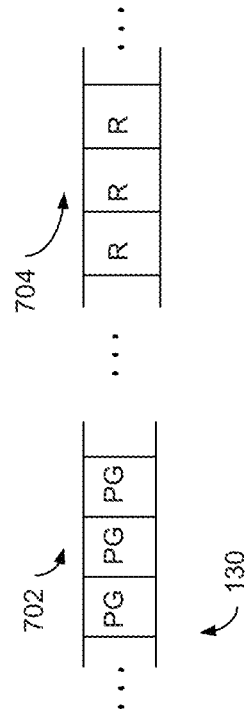
FIG. 7 is another example of encoding ACP metadata by tagging different segments of video frames.

FIG. 7 is another example of encoding ACP metadata by tagging different segments of consecutive video frames. In FIG. 7, a first segment 702 of N frames of video, corresponding to several minutes or longer of video, have been encoded with an MP rating of PG. A second segment 704 of M frames of video, also corresponding to several minutes or longer of video, have been encoded with an MP rating of R. An authorized receiver that implements parental controls tied to MP rating, i.e., into which a user has entered parental controls tied to MP rating, may compare the encoded MP rating against the entered rating prior to rendering the encoded/encrypted video segments. Alternatively, portions of a given set of frames may have a special ACP, which allows an authorized receiver to 'blur' out portions of the screen pertaining to an unacceptable ACP (e.g., part of the video screen may be blurred due to inappropriate content based on policy, while other parts of the video is rendered unaltered).

Figure 8:
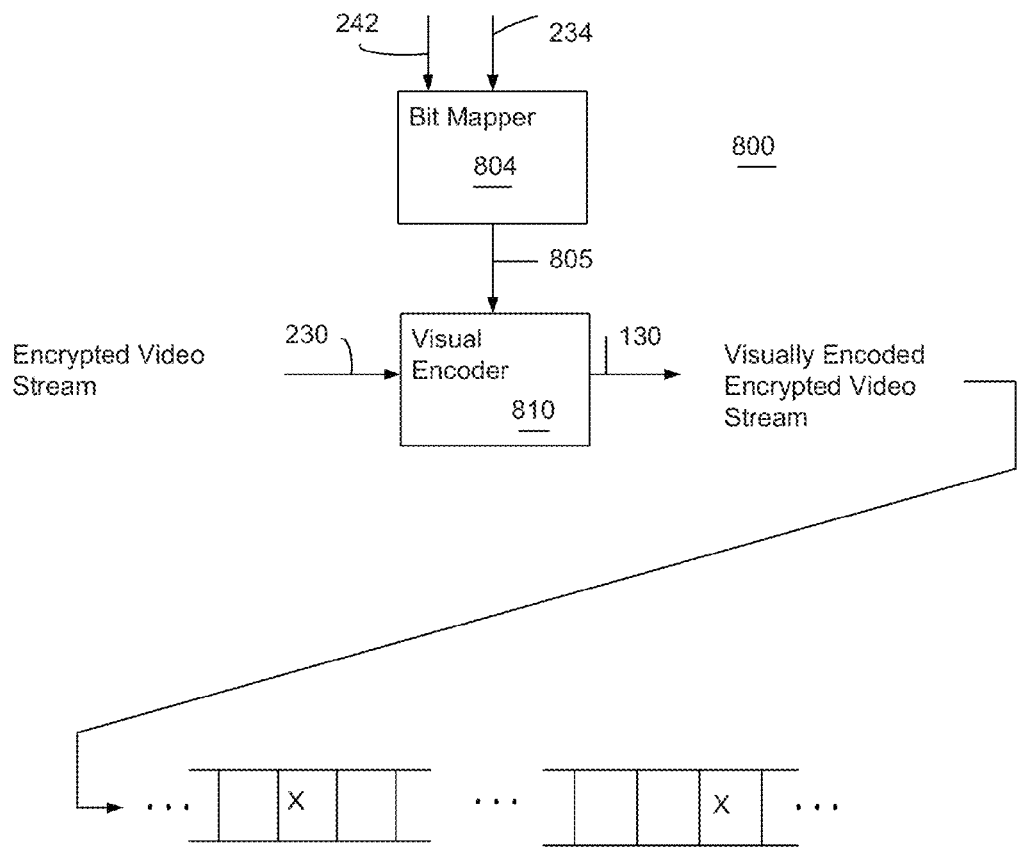
FIG. 8 is an example visual encoder module for visually encoding ACP metadata and/or watermarks.

FIG. 8 is an example of visually encoding ACP metadata and/or a watermark with a visual encoder module 800. Visual encoder 800 may be part of encoder 240. A bit mapper 804 receives ACP metadata 234 and/or a watermark 242 and maps the ACP metadata/watermark to a time series stream of bits 805, e.g., a stream of ones and zeroes, that overlay the frames of encrypted video 230. Visual encoder 810 visually encodes selected frames of encrypted video 230 based on the stream of bits 805, to produce encoded video 130 as visually encoded video. An example of such visual encoding includes modulating various visual attributes of pixels in the encrypted video objects, such as pixel luminosity, grey scale, or color. Alternatively, or in addition, video frames may be inserted into the encrypted video. Examples of visual encoding to represent the bit stream 805, include inserting blank or empty video frames, blinking video frames, colored video frames, or video frames having pixel regions set to a predetermined gray scale level, video frames with embedded patterns, and color changes. Such frames may be inserted between actual encrypted video frames, at an exemplary rate of once every 30 video frames. Such inserted frames are depicted in FIG. 8 as frames carrying "X". The process is referred to as visually encoding because the encoded ACP metadata/watermark frames themselves may be rendered and displayed in the form in which they were encoded, such as blinking frames, etc., rather than as random noise. However, as rendered, their infrequency and/or subtlety would make such ACP metadata/watermark frames undetectable to the human eye. An authorized device is able to recognize and decode the visually encoded frames, and convert them back to their original bit stream format, however, an unauthorized device is unable to recognize the visually encoded frames.

Figure 8A:
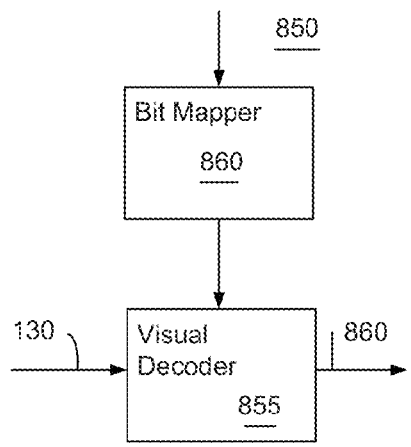
FIG. 8A is an example visual decoder corresponding to the visual encoder of FIG. 8.

FIG. 8A is an example visual decoder module 850, corresponding to visual encoder module 800. Visual decoder module 850 operates in reverse to visual encoder module 800, and may be implemented in CAC decoder 122 as part of ACP decoder 312. Visual decoder module 850 includes a visual decoder 855 that visually decodes received visually encoded video responsive to a bit mapper 860. Bit mapper 860 prompts visual decoder 855 to search for a variety of visual patterns in the received encoded video, such as periodically blanked video data frames. Visual decoder module 850 recovers the visually encoded ACP metadata and/or watermark 860 represented in the visually encoded patterns, which may be in the form of a recovered bit stream representative of bit stream 805.

Figure 9:
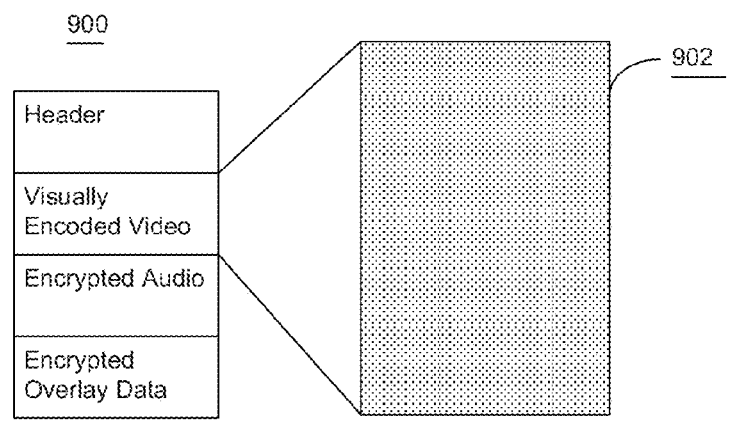
FIG. 9 is an illustration of an exemplary form of visual encoding of ACP metadata and/or watermarks, according to an embodiment.

FIG. 9 is an example of visual encoding of ACP metadata and/or watermarks. A visually encoded VOB 900 may include visually encoded video 902 having a luminosity that has been reduced by 50% according to bit stream 805, or, alternatively, encrypted video that has been replaced by a blanked video portion, which would be rendered as a white flash.

Figure 10:
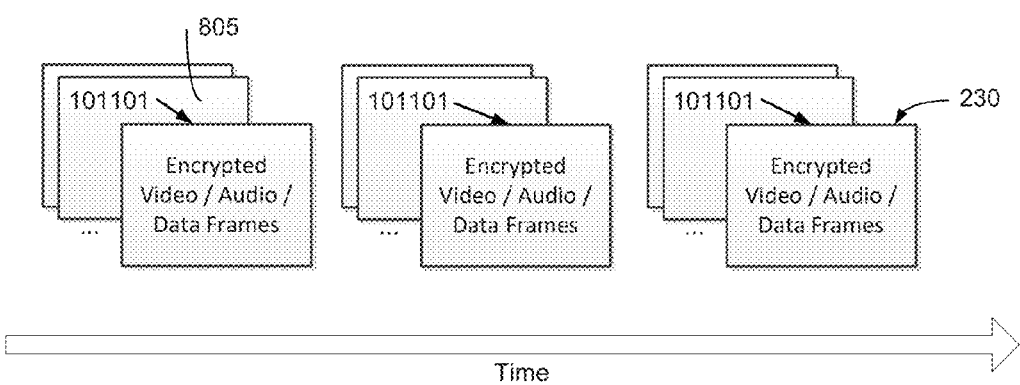
FIG. 10 is an exemplary time ordered representation of visual encoding of ACP metadata and/or watermarks.

FIG. 10 is a diagrammatic representation of visual encoding of ACP metadata and/or watermarks performed by visual encoder 800, according to an embodiment. Encrypted video frames in encrypted video 230 are visually encoded with the overlaid time series of bits (ACP metadata or watermarks) 805. The visual encoding persists along encoded video 130, as an embedded, visible binary code.

Figure 11:
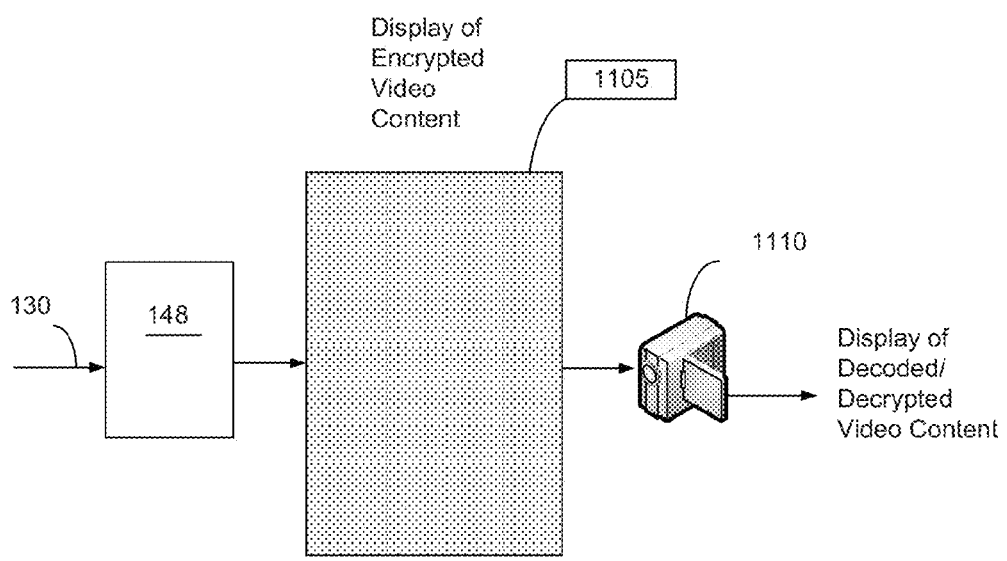
FIG. 11 is an illustration of an unauthorized user device and an authorized user device each processing visually encoded ACP metadata and/or watermarks to render video properly, according to an embodiment.

FIG. 11 is an illustration of an example of how visual encoding of ACP metadata and/or watermarks may be used with unauthorized and authorized devices to render video. First, unauthorized device 148 receives visually encoded video 130. Unauthorized machine 148 is unable to recover the ACP metadata and/or watermarks necessary to identify and then render the encoded video 130 properly, e.g., so that it appears as intelligible video to the human eye. Therefore, machine 148 renders encrypted video in encoded video 130 as unintelligible video, such as pseudorandom video noise 1105. Also, the visually encoded metadata and/or watermarks in video 130 are displayed in the video noise 1105 according to how they were encoded, e.g., they may be displayed as periodically blanked, or blinking, video frames, modulated pixel luminosity, etc. This rendering of the visually encoded ACP metadata and/or watermarks is unintelligible to device 148 or a person viewing noise 1105.

An authorized device, e.g., camera 1110, captures/records rendered video noise 1105 visually encoded with the ACP metadata and/or watermarks, and provides the captured video to its CAC visual decoder. Device 1110 is able to detect, i.e., visually decode, the captured encoded video to recover the ACP metadata and/or watermarks and related information, required for proper rendering. Accordingly, device 1110 is able to decrypt and render the video properly for viewing by a user.

Figure 12:
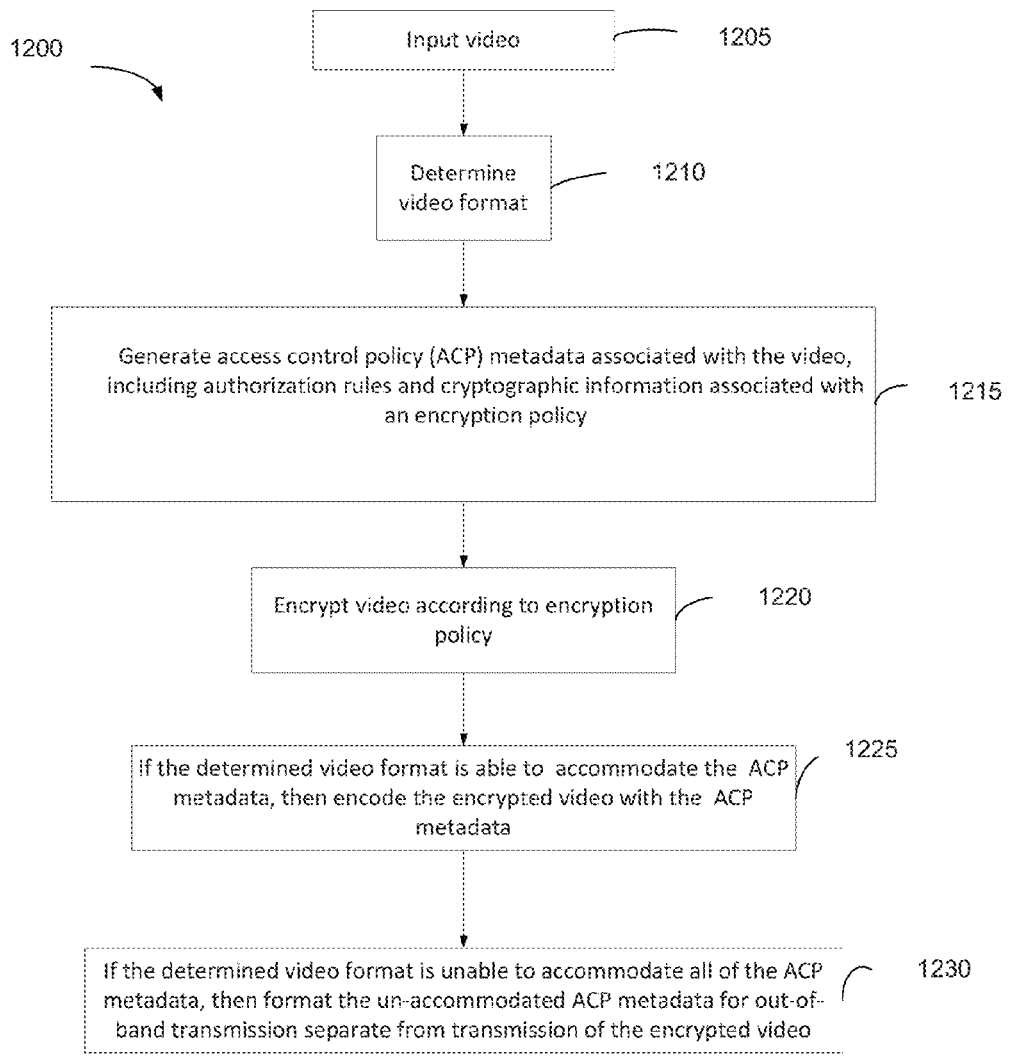
FIG. 12 is a flowchart of an example method performed by a CAC application to prepare encoded video.

FIG. 12 is a flowchart of an example method 1200 performed by a CAC application prepare encoded video in any format.

At 1205, video is input. The video may be raw or, alternatively, formatted according to a compression technique, such as MPEG-n.

At 1210, a format of the video is determined and format control and information is made available to subsequent processing of the video so that the format is maintained.

At 1215, access control policy (ACP) metadata associated with the input video is generated, and includes authorization rules and cryptographic information associated with an encryption policy.

At 1220, the input video is encrypted according to the encryption policy.

At 1225, if the video format determined at 1210 is able to accommodate the ACP metadata, then the encrypted video is encoded with the ACP metadata.

At 1230, if the video format determined at 1210 is unable to accommodate all of the ACP metadata, then the un-accommodated ACP metadata is formatted for out-of-band transmission separate from the transmission of the encrypted video.

Figure 13:
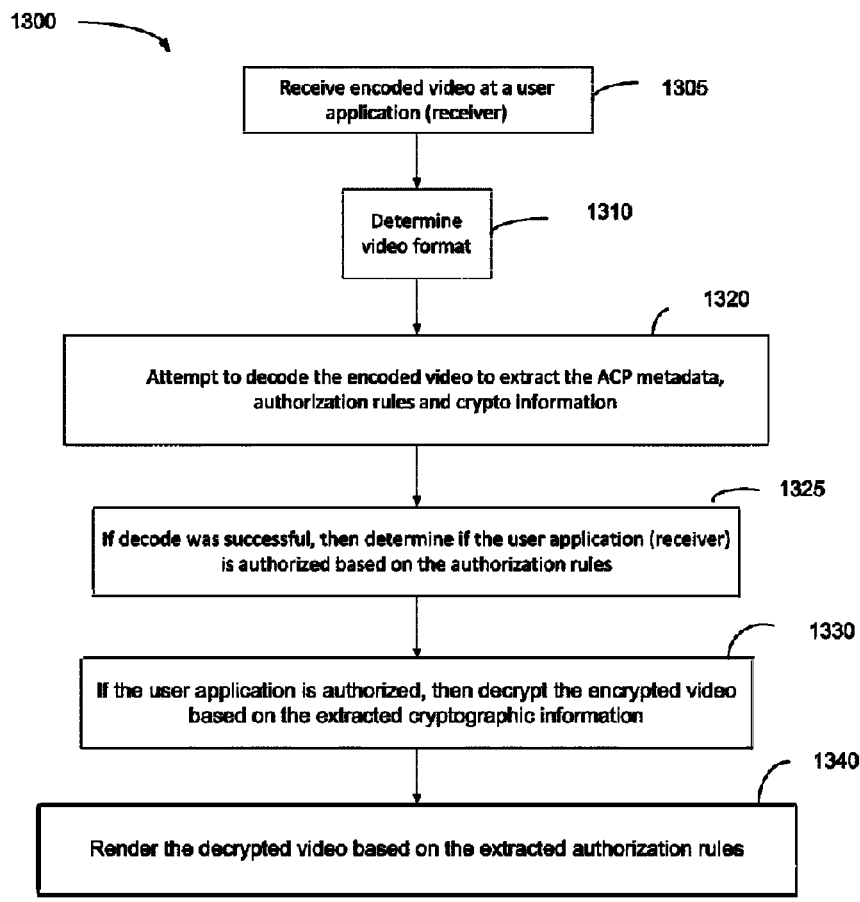
FIG. 13 is a flowchart of an example method performed by a CAC application to process already encoded video.

FIG. 13 is a flowchart of an example method 1300 performed by a CAC application to process already encoded video.

At 1305, encoded video is received at a user environment (receiver device such as a graphics engine module, independent of the normal operating system environment).

At 1310, the format of the received encoded video is determined, if possible.

At 1320, an attempt is made to decode the encoded video to extract the ACP metadata from it, including authorization rules and cryptographic information.

At 1325, if the attempt to decode was successful, then it is determined whether the user environment (e.g., device) is authorized based on a comparison between credentials of the environment and the extracted authorization rules.

At 1330, if the user environment device) is authorized, then the encrypted portions of the video are decrypted based on the extracted cryptographic information.

At 1340, the decrypted video is rendered properly based on the extracted authorization rules.

Figure 14:
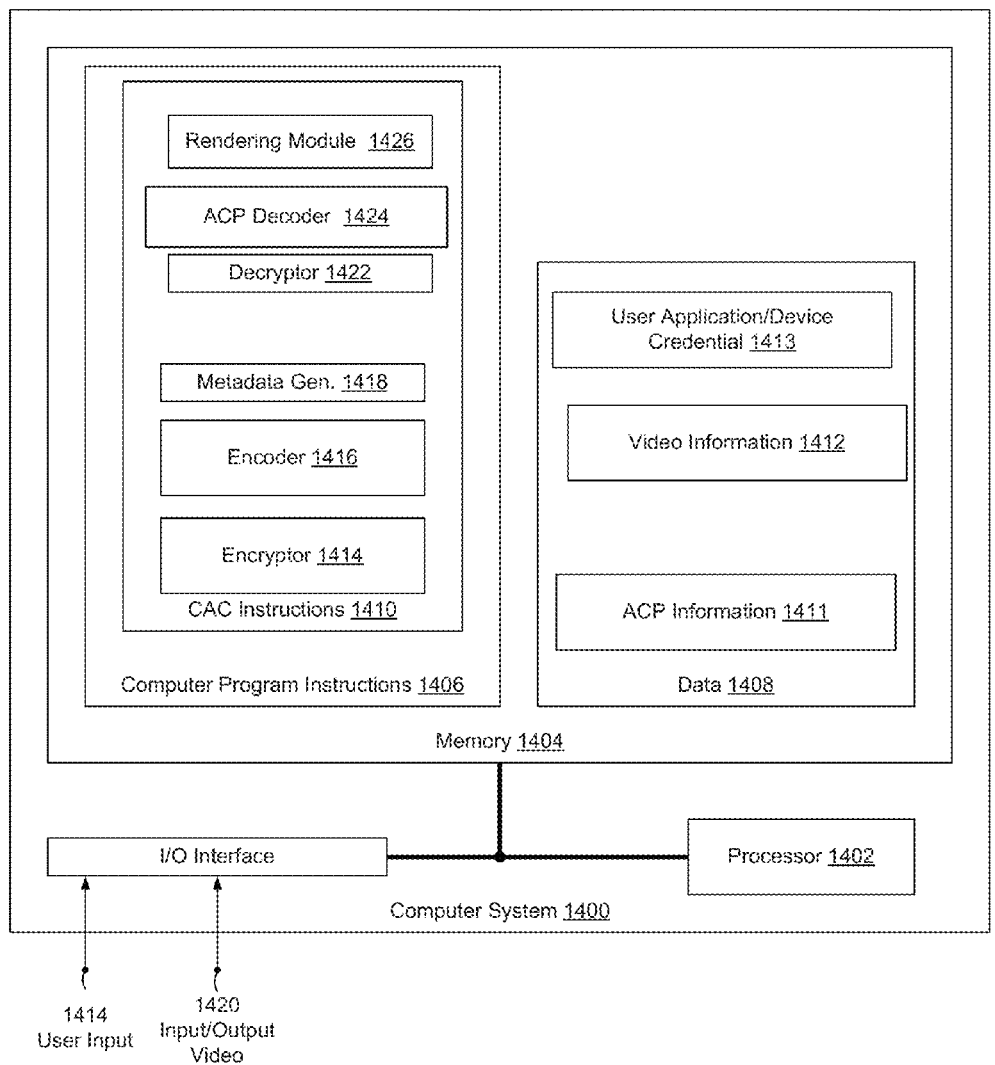
FIG. 14 is a block diagram of an example computer processor system configured for cryptographic access control and processing of video.

FIG. 14 is a block diagram of a computer processor system 1400 configured for cryptographic access control of video, according to an embodiment.

Processor system 1400 may include one or more instruction processing units, illustrated here as a processor 1402, which may include a processor, one or more processor cores, or a micro-controller.

Computer system 1400 may include memory, cache, registers, and/or storage, illustrated here as memory 1404.

Memory 1404 may include one or more non-transitory computer readable mediums encoded with a computer program, including instructions 1406.

Memory 1404 may include data 1408 to be used by processor 1402 in executing instructions 1406, and/or generated by processor 1402 during execution of instructions 1406. Data 1408 includes ACP information 1411, including authorization rules and cryptographic information, video information 1412, including raw, formatted, encrypted, and encoded video information, and user/device credentials 1413 related to the authorization rules, which may be entered by a user through the I/O interface.

Instructions 1406 includes instructions for an encryptor 1414, encoder 1416, and metadata generator 1418, collectively, a CAC encoder, to cause processor 1402 to prepare an encrypted and encoded video from a raw or formatted input video 1420, such as described in one or more examples above.

Instructions 1406 also include instructions for a decryptor 1422, an ACP decoder 1424, and a video rendering module 1426, collectively a CAC decoder, to cause processor 1402 to decode ACP information from encoded video 1420, and then decrypt and render the decoded video, such as described in one or more examples above. In an embodiment, both ACP decoder 1424 and video rendering module 1426 may be incorporated into a graphics rendering engine that operates independent of an operating system associated with computer system 1400. In addition, ACP information 1411, and/or encoder modules 1414, 1416, and 1418 may be incorporated into the graphics engine and may also operate independent of the operating system.

Method, apparatus, system, and computer readable medium embodiments are described.

One embodiment includes a non-transitory computer readable medium encoded with a computer program, including instructions to cause a processor to generate as metadata an access control policy (ACP) associated with video, the ACP including authorization rules and cryptographic information associated with an encryption policy. The method also includes encrypting the video according to the encryption policy, and encoding the encrypted video with the authorization rules and the cryptographic information, wherein the authorization rules and cryptographic information are used for decrypting and rendering the encoded video.

The embodiment further includes instructions to cause the processor to visually encode of the encrypted video with at least portions of the authorization rules and the cryptographic information, such that the visually encoded video is renderable as the video by a device that is able to visually decode the authorization rules and the cryptographic information in the visually encoded video, and visually unintelligible video by a device that is unable to visually decode the authorization rules and the cryptographic information in the visually encoded video.

The embodiment further includes instructions to cause the processor to bit map the at least portions of the authorization rules and the cryptographic information into a time series stream of bits, and visually encode the encrypted video with the time series stream of bits.

The embodiment further includes instructions to cause the processor to visually encode the encrypted video with a watermark.

The encrypted video may include a series of video objects containing encrypted video and a video object header, and, in the embodiment, the instructions further include instructions to cause the processor to periodically insert the ACP metadata into the video objects.

The encrypted video may include a series of video frames each containing one or more video objects, and the instructions further include instructions to cause the processor to periodically insert the ACP metadata as a data frame among the video frames.

The authorization rules may include at least one credential that an authorized device must have to be able to decrypt the encrypted video and render the decrypted video, and the cryptographic information may include an identifier that associates with a cryptographic key necessary to decrypt the encrypted video.

The embodiment further includes instructions to cause the processor to encode different time segments of the encrypted video with corresponding different authorization rules.

The embodiment further includes instructions to cause the processor to store the encoded video as an encoded video file in a cloud service.

The encryption policy may include asymmetric encryption.

The embodiment further includes instructions to cause the processor to format at least portions of the ACT as additional metadata associated with the video for transmission in an out-of-band channel separate from transmission of the encoded video.

The embodiment further includes instructions to cause the processor to:
receive the encoded video at a device;
attempt to decode the received encoded video to extract the authorization rules and the cryptographic information from the received encoded video;
if the authorization rules and the cryptographic information are successfully extracted in the attempt to decode, then
determine whether the device is authorized by comparing at least one credential of the device to the extracted authorization rules;
if the device is authorized, then decrypt the encrypted video based on the extracted cryptographic information; and
render the decrypted video based on the extracted authorization rules.

The processor may be a processor of a graphics engine, and the instructions cause the processor of the graphics engine to attempt to decode the encoded video, determine whether the device is authorized, decrypt the encrypted video, and render the decrypted video. The processor of the graphics engine attempts to decode the encoded video, determine whether the device is authorized, decrypt the encrypted video, and render the decrypted video, independent of an operating system processor.

Another embodiment includes an apparatus for cryptographic access control of video, including a metadata generator to generate as metadata an access control policy (ACP) associated with the video, the ACP including authorization rules and cryptographic information associated with an encryption policy, an encryptor to encrypt the video according to the encryption policy, and an encoder to encode the encrypted video with the authorization rules and the cryptographic information, wherein the authorization rules and cryptographic information are used for decrypting and rendering the encoded video.

The encoder visually encodes the encrypted video with at least portions of the authorization rules and the cryptographic information, such that the visually encoded video is renderable as the video by a device that is able to visually decode the authorization rules and the cryptographic information in the visually encoded video, and visually unintelligible video by a device that is unable to visually decode the authorization rules and the cryptographic information in the visually encoded video.

The encoder may include a bit mapper to bit map the at least portions of the authorization rules and the cryptographic information into a time series stream of bits, and the encoder encodes the encrypted video with the time series stream of bits.

The encoder may visually encode the encrypted video with a watermark.

The encrypted video may include a series of video objects containing encrypted video and a video object header, and the encoder periodically inserts the ACP metadata into the video objects.

The encrypted video may include a series of video frames each containing one or more video objects, and the encoder periodically inserts the ACP metadata as a data frame among the video frames.

The authorization rules may include at least one credential that an authorized device must have to be able to decrypt the encrypted video and render the decrypted video, and the cryptographic information may include an identifier that associates with a cryptographic key necessary to decrypt the encrypted video.

The encoder may encode different time segments of the encrypted video with corresponding different authorization rules.

The encoder may transmit the encoded video as an encoded video file to a cloud service.

The encryption policy may include asymmetric encryption.

The metadata generator may format at least portions of the ACP as additional metadata associated with the video for transmission in an out-of-band channel separate from transmission of the encoded video.

The apparatus may further comprise a device to receive the encoded video, the device including:

a decoder to decode the received encoded video, to thereby extract the authorization rules and the cryptographic information from the received encoded video, wherein if the decoder successfully extracts the authorization rules and the cryptographic information in the attempt to decode, then the decoder determines whether the device is authorized by comparing at least one credential of the device to the extracted authorization rules;

an encryptor to decrypt the encrypted video based on the extracted cryptographic information only if the decoder determines the device is authorized; and a rendering module to render the decrypted video based on the extracted authorization rules.

The device to receive the encoded video may further include a graphics engine which incorporates the decoder and the rendering module.

The device to receive the encoded video may further include an operating system, and the device decoder and the device rendering module incorporated in the graphics engine may operate independent of the device operating system.

Another embodiment includes a method of cryptographic access control of video, comprising generating as metadata an access control policy (ACP) associated with the video, the ACP including authorization rules and cryptographic information associated with an encryption policy, encrypting the video according to the encryption policy, and encoding the encrypted video with the authorization rules and the cryptographic information, wherein the authorization rules and cryptographic information are used for decrypting and rendering the encoded video.

The encoding includes visually encoding the encrypted video with at least portions of the authorization rules and the cryptographic information, such that the visually encoded video is renderable as the video by a device that is able to visually decode the authorization rules and the cryptographic information in the visually encoded video, and visually unintelligible video by a device that is unable to visually decode the authorization rules and the cryptographic information in the visually encoded video.

The visually encoding includes bit mapping the at least portions of the authorization rules and the cryptographic information into a time series stream of bits and visually encoding the encrypted video with the time series stream of bits.

The visually encoding includes further visually encoding the encrypted video with a watermark.

The encrypted video may comprise a series of video objects containing encrypted video and a video object header, the encoding including periodically inserting the ACP metadata into the video objects.

The encrypted video may comprise a series of video frames each containing one or more video objects, the encoding including periodically inserting the ACP metadata as a data frame among the video frames.

The authorization rules include at least one credential that an authorized device must have to be able to decrypt the encrypted video and render the decrypted video, and the cryptographic information includes an identifier that associates with a cryptographic key necessary to decrypt the encrypted video.

The encoding may include encoding different time segments of the encrypted video with corresponding different authorization rules.

The method further comprises storing the encoded video as an encoded video file in a cloud service.

The encryption policy may include asymmetric encryption.

The method may further comprise formatting at least portions of the ACP as additional metadata associated with the video for transmission in an out-of-band channel separate from transmission of the encoded video.

The method further comprises receiving the encoded video at a device, and attempting to decode the received encoded video to extract the authorization rules and the cryptographic information from the received encoded video. If the authorization rules and the cryptographic information are successfully extracted in the attempt to decode, then the method further comprises determining whether the device is authorized, the determining including comparing at least one credential of the device to the extracted authorization rules. If the device is authorized, then the method further comprises decrypting the encrypted video based on the extracted cryptographic information, and rendering the decrypted video based on the extracted authorization rules.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A non-transitory computer readable medium encoded with a computer program, including instructions to cause a processor to:
   generate as metadata an access control policy (ACP) associated with video, the ACP including authorization rules and cryptographic information associated with an encryption policy;
   encrypt the video according to the encryption policy; and
   encode the encrypted video with the authorization rules and the cryptographic information, wherein the authorization rules and cryptographic information are used for decrypting and rendering the encoded video, and wherein the encoding includes encoding different time segments of the encrypted video with corresponding different authorization rules.

2. The computer readable medium of claim 1, further including instructions to cause the processor to visually encode the encrypted video with at least portions of the authorization rules and the cryptographic information, such that the visually encoded video is renderable as
   the video by a device that is able to visually decode the authorization rules and the cryptographic information in the visually encoded video, and
   visually unintelligible video by a device that is unable to visually decode the authorization rules and the cryptographic information in the visually encoded video.

3. The computer readable medium of claim 2, further including instructions to cause the processor to:
   bit map the at least portions of the authorization rules and the cryptographic information into a time series stream of bits; and
   visually encode the encrypted video with the time series stream of bits.

4. The computer readable medium of claim 2, further including instructions to cause the processor to visually encode the encrypted video with a watermark.

5. The computer readable medium of claim 1, wherein the encrypted video includes a series of video objects containing encrypted video and a video object header, and wherein the instructions further include instructions to cause the processor to periodically insert the ACP metadata into the video objects.

6. The computer readable medium of claim 1, wherein the encrypted video includes a series of video frames each containing one or more video objects, and wherein the instructions further include instructions to cause the processor to periodically insert the ACP metadata as a data frame among the video frames.

7. The computer readable medium of claim 1, wherein:
   the authorization rules include at least one credential that an authorized device must have to be able to decrypt the encrypted video and render the decrypted video; and
   the cryptographic information includes an identifier that associates with a cryptographic key necessary to decrypt the encrypted video.

8. The computer readable medium of claim 1, further including instructions to cause the processor to format at least portions of the ACP as additional metadata associated with the video for transmission in an out-of-band channel separate from transmission of the encoded video.

9. The computer readable medium of claim 1, further including instructions to cause the processor to:
   receive the encoded video at a device;
   attempt to decode the received encoded video to extract the authorization rules and the cryptographic information from the received encoded video;
   if the authorization rules and the cryptographic information are successfully extracted in the attempt to decode, then determine whether the device is authorized by comparing at least one credential of the device to the extracted authorization rules;
   if the device is authorized, then decrypt the encrypted video based on the extracted cryptographic information; and
   render the decrypted video based on the extracted authorization rules.

10. The computer readable medium of claim 9, wherein the processor is a processor of a graphics engine, and the instructions cause the processor of the graphics engine to attempt to decode the encoded video, determine whether the device is authorized, decrypt the encrypted video, and render the decrypted video.

11. An apparatus for cryptographic access control of video, the apparatus comprising:
   a memory;
   a processor in communication with the memory, the processor comprising:
      a metadata generator to generate as metadata an access control policy (ACP) associated with the video, the ACP including authorization rules and cryptographic information associated with an encryption policy;
      an encryptor to encrypt the video according to the encryption policy; and
      an encoder to encode the encrypted video with the authorization rules and the cryptographic information, wherein the authorization rules and cryptographic information are used for decrypting and rendering the encoded video, and wherein the encoder is to encode different time segments of the encrypted video with corresponding different authorization rules.

12. The apparatus of claim 11, wherein the encoder visually encodes the encrypted video with at least portions of the authorization rules and the cryptographic information, such that the visually encoded video is renderable as the video by a device that is able to visually decode the authorization rules and the cryptographic information in the visually encoded video, and visually unintelligible video by a device that is unable to visually decode the authorization rules and the cryptographic information in the visually encoded video.

13. The apparatus of claim 12, wherein:

the encoder includes a bit mapper to bit map the at least portions of the authorization rules and the cryptographic information into a time series stream of bits; and the encoder encodes the encrypted video with the time series stream of bits.

14. The apparatus of claim 12, wherein the encoder visually encodes the encrypted video with a watermark.

15. The apparatus of claim 11, wherein the encrypted video includes a series of video objects containing encrypted video and a video object header, and wherein the encoder periodically inserts the ACP metadata into the video objects.

16. The apparatus of claim 11, wherein the encrypted video includes a series of video frames each containing one or more video objects, and wherein the encoder periodically inserts the ACP metadata as a data frame among the video frames.

17. The apparatus of claim 11, wherein:

the authorization rules include at least one credential that an authorized device must have to be able to decrypt the encrypted video and render the decrypted video; and the cryptographic information includes an identifier that associates with a cryptographic key necessary to decrypt the encrypted video.

18. The apparatus of claim 11, wherein the metadata generator formats at least portions of the ACP as additional metadata associated with the video for transmission in an out-of-band channel separate from transmission of the encoded video.

19. The apparatus of claim 11, further comprising a device to receive the encoded video, the device including:

a decoder to decode the received encoded video, to thereby extract the authorization rules and the cryptographic information from the received encoded video, wherein if the decoder successfully extracts the authorization rules and the cryptographic information in the attempt to decode, then the decoder determines whether the device is authorized by comparing at least one credential of the device to the extracted authorization rules;

an encryptor to decrypt the encrypted video based on the extracted cryptographic information only if the decoder determines the device is authorized; and a rendering module to render the decrypted video based on the extracted authorization rules.

20. The apparatus of claim 19, wherein the device to receive the encoded video further includes a graphics engine which incorporates the decoder and the rendering module.

21. The apparatus of claim 20, wherein the device to receive the encoded video further includes an operating system, and the device decoder and the device rendering module incorporated in the graphics engine operate independent of the device operating system.

22. A method of cryptographic access control of video, comprising:

generating as metadata, by processor in communication with a memory, an access control policy (ACP) associated with the video, the ACP including authorization rules and cryptographic information associated with an encryption policy;

encrypting, by the processor, the video according to the encryption policy; and encoding, by the processor, the encrypted video with the authorization rules and the cryptographic information, wherein the authorization rules and cryptographic information are used for decrypting and rendering the encoded video, and wherein the encoding includes encoding different time segments of the encrypted video with corresponding different authorization rules.

23. The method of claim 22, wherein said encoding includes visually encoding the encrypted video with at least portions of the authorization rules and the cryptographic information, such that the visually encoded video is renderable as the video by a device that is able to visually decode the authorization rules and the cryptographic information in the visually encoded video, and visually unintelligible video by a device that is unable to visually decode the authorization rules and the cryptographic information in the visually encoded video.

* * * * *